(12) United States Patent
Shaver et al.

(10) Patent No.: US 8,674,642 B2
(45) Date of Patent: Mar. 18, 2014

(54) PARTIAL DISCHARGE MONITORING SYSTEMS AND METHODS

(75) Inventors: Clark D. Shaver, Lamar, MO (US); Thomas M. Scott, Broken Arrow, OK (US); Ignacio Martinez, Rio de Janeiro (BR); Sean A. Cain, Owasso, OK (US)

(73) Assignee: Baker Hughes Incorporated, Houston, TX (US)

( * ) Notice: Subject to any disclaimer, the term of this patent is extended or adjusted under 35 U.S.C. 154(b) by 540 days.

(21) Appl. No.: 13/072,989

(22) Filed: Mar. 28, 2011

(65) Prior Publication Data

US 2012/0248946 A1      Oct. 4, 2012

(51) Int. Cl.
*H02K 11/00*      (2006.01)

(52) U.S. Cl.
USPC ............................ 318/490; 318/488; 318/558

(58) Field of Classification Search
USPC ......... 318/565, 798, 471–473, 488, 490, 538, 318/558; 388/909, 933; 310/68 B, 68 C, 310/254.1, 273
See application file for complete search history.

(56) References Cited

U.S. PATENT DOCUMENTS

| | | | |
|---|---|---|---|
| 5,941,305 A * | 8/1999 | Thrasher et al. | 166/53 |
| 6,242,900 B1 * | 6/2001 | Fawcett et al. | 324/76.65 |
| 7,042,229 B2 * | 5/2006 | Lee et al. | 324/551 |
| 781,968 A1 | 10/2010 | Nicholson | |
| 8,051,912 B2 * | 11/2011 | Layton | 166/369 |
| 8,466,690 B2 * | 6/2013 | Stewart et al. | 324/551 |
| 2005/0012507 A1 | 1/2005 | Kaneda | |
| 2005/0035768 A1 | 2/2005 | Rabach | |
| 2005/0218907 A1 * | 10/2005 | Lee et al. | 324/551 |
| 2006/0022679 A1 * | 2/2006 | Obata et al. | 324/551 |
| 2007/0151446 A1 | 7/2007 | Younsi | |
| 2010/0295555 A1 | 11/2010 | Emanuel | |

FOREIGN PATENT DOCUMENTS

WO   WO-2007-107815   9/2007

OTHER PUBLICATIONS

Technical Specification, Rotating Electrical Machines, International Electrotechnical Commission, TS 60034-18-41, Oct. 2006.

* cited by examiner

*Primary Examiner* — Bentsu Ro
(74) *Attorney, Agent, or Firm* — Law Offices of Mark L. Berrier

(57) ABSTRACT

Systems and methods for monitoring partial discharge within a remotely located and inaccessible electric motor. One embodiment comprises a downhole electric motor of an electric submersible pump system positioned in a well. The motor includes a partial discharge monitoring system coupled to the motor's power terminals. The partial discharge monitoring system includes a filter subsystem, a processing subsystem, and a communication subsystem. The filter subsystem allows higher frequency signals to pass from the terminals to the processing subsystem. The processing subsystem identifies signal constituents that are associated with partial discharge, and may perform various types of processing or analysis of the signal received from the processing subsystem. The partial discharge information generated by the processing subsystem is passed to the communication subsystem, which communicates the information to remotely located surface equipment. The subsystems of the partial discharge monitoring system are configured to operate in a high-pressure, high-temperature downhole environment.

20 Claims, 3 Drawing Sheets

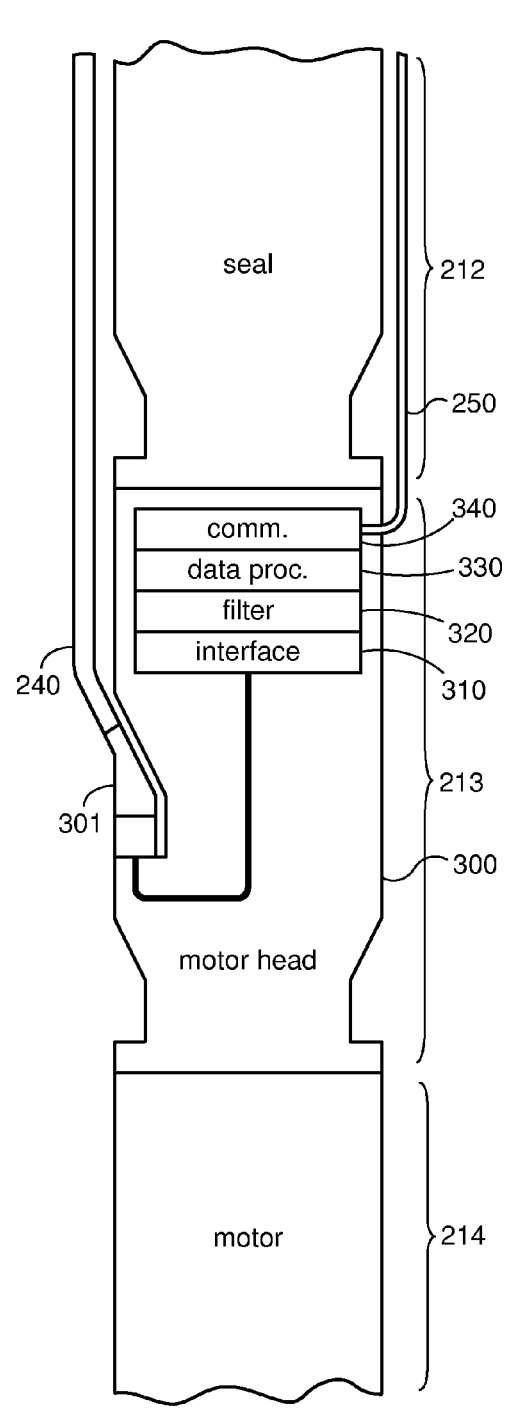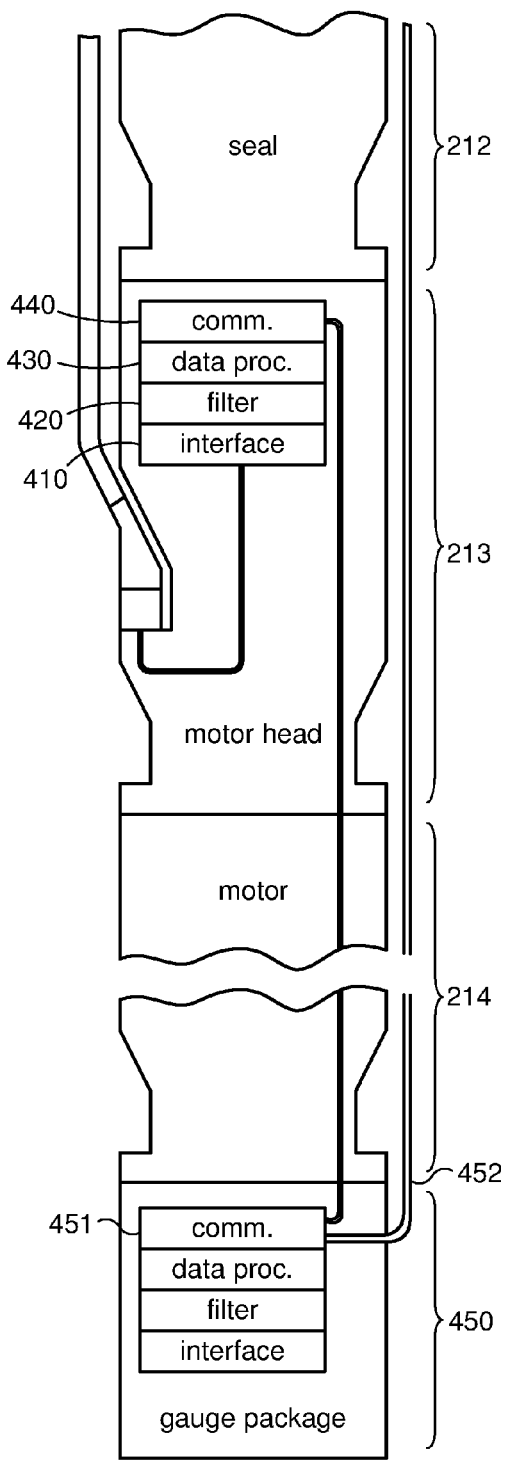

PARTIAL DISCHARGE MONITORING SYSTEMS AND METHODS

BACKGROUND

1. Field of the Invention

The invention relates generally to monitoring partial discharges, and more particularly to systems and methods for monitoring partial discharge within the stator of a remotely located electric motor.

2. Related Art

Oil production often requires the use of artificial lift systems to recover oil and other well fluids from wells. These artificial lift systems may include, for example, electric submersible pump (ESP) systems and subsea boosting systems. Because of the high cost of these systems (including installing, operating, maintaining, reworking, etc.) and the inaccessibility of the systems, it is important that the systems are as reliable as possible.

One of the system components that impacts their overall reliability is the electrical insulation in the system. Insulation is provided between the turns of the stator windings, between the windings of each phase (motors typically utilize three-phase power), and between the windings and the stator core and housing. Poor insulation quality may degrade the performance of the motor or even cause the system to fail. It is therefore important to be able to determine whether the quality of the electrical insulation is degraded (e.g., through damage during manufacture or through extended operation of the system).

Partial discharge testing can provide one measure of insulation quality in a motor. "Partial discharge" is a partial dielectric breakdown of an insulator. This breakdown occurs in small isolated areas in the insulator, often at weak points or defects such as small gas bubbles, voids or inclusions in the insulator. Partial discharge is seen most often in high voltage applications where potential levels are high and non-uniform electric fields generate accentuated electrical stresses. Any small inclusion or void in the high potential area of the insulation system is more likely to breakdown, creating a discharge in the void. These small discharges span across the void, and do not discharge across the entire insulating material. Consequently, it is only a partial discharge. Partial discharges cause insulation to deteriorate, making further partial discharges more likely.

As noted above, partial discharge can be an indicator of insulation damage or deterioration. Partial discharge testing can be performed offline (when the motor is not operating) or online (during operation of the motor). There are a variety of techniques for sensing partial discharge, including radio-frequency and acoustic sensing. It is preferable to position the sensing devices as closely as possible to the insulation that is of concern in order to maximize their sensing capabilities. In surface motors, there may be a great deal of flexibility in the positioning of the sensors and the connection of these sensors to monitoring equipment, whether the testing is performed offline or online. In motors that are used in ESP's and other remotely located systems, however, the physical (e.g., size) constraints on the motors and the extremely harsh environments in which they operate can make the prospect of testing much more complicated.

In addition to the difficulty of implementing partial discharge testing in motors used in artificial lift applications, various other factors have conventionally discouraged this testing. For example, downhole and subsea motors typically operate at lower voltages than comparable surface motors, so partial discharge is mitigated. Further, the high pressures that are present are communicated to the oil within the motor and may reduce partial discharge to the point that it is negligible. Still further, the lifespan of a downhole or subsea motor is typically expected to be relatively short (e.g., five years), so insulation degradation due to partial discharge has not traditionally been a concern in these motors.

Because of the complexity of implementing partial discharge testing in motors for downhole, subsea and other remote and inaccessible applications, and the fact that partial discharge has not traditionally been a concern in these motors, testing of the motors conventionally is not performed after they are installed and operating.

SUMMARY OF THE INVENTION

While conventional wisdom has been to disregard partial discharge in motors for downhole, subsea and other remote and inaccessible applications, it has recently become more of a concern. This is a result of a number of factors, such as the increasing voltages of these motors, which allows the size and cost of power cable to be reduced. Additionally, increases in the reliability and lifespans of these motors has increased the importance of monitoring partial discharge in the motors after they have been installed. The present systems and methods therefore provide means to monitor partial discharge in motors that are utilized in these applications.

The present invention includes systems and methods for monitoring partial discharge within electric motors for downhole, subsea and other remote and inaccessible applications. For the purposes of this disclosure, exemplary embodiments will focus on downhole applications such as ESP's, but alternative embodiments may be implemented in other downhole applications, subsea applications (e.g., subsea boosting applications), and other applications in which the motors are in locations that are remote from and inaccessible by operating or service personnel.

One embodiment comprises a downhole electric motor, such as may be used to drive a pump in an ESP system. The motor is positioned in a well and includes a partial discharge monitoring system that is coupled to the electrical terminals through which power is provided to the motor. The partial discharge monitoring system includes a filter subsystem, a processing subsystem, and a communication subsystem. The filter subsystem allows higher frequency signals to pass from the terminals to the processing subsystem. The processing subsystem identifies signal constituents that are associated with partial discharge, and may perform various types of processing or analyses of the signal received from the processing subsystem. The partial discharge information generated by the processing subsystem is then passed to the communication subsystem, which communicates the information to the surface of the well. The subsystems of the partial discharge monitoring system are configured to operate in a high-pressure, high-temperature environment such as may exist downhole in a well.

The present invention includes systems and methods for monitoring partial discharge within a downhole electric motor. One embodiment comprises a downhole electric motor, such as may be used to drive a pump in an ESP system. The motor is positioned in a well and includes a partial discharge monitoring system that is coupled to the electrical terminals through which power is provided to the motor. The partial discharge monitoring system includes a filter subsystem, a processing subsystem, and a communication subsystem. The filter subsystem allows higher frequency signals to pass from the terminals to the processing subsystem. The processing subsystem identifies signal constituents that are associated with partial discharge, and may perform various types of processing or analyses of the signal received from the processing subsystem. The partial discharge information generated by the processing subsystem is then passed to the communication subsystem, which communicates the information to the surface of the well. The subsystems of the partial discharge monitoring system are configured to operate in a high-pressure, high-temperature environment such as may exist downhole in a well. The components of the partial discharge system may be contained in a motor head which is connected to the motor.

The communication subsystem may be configured to communicate the partial discharge information to the remote surface equipment via a dedicated communication line, or it may utilize a communication channel impressed upon a power cable that provides power to the motor. The communication subsystem of the partial discharge system may alternatively be coupled to a gauge package and configured to communicate the partial discharge information to the surface equipment through a communication channel of the gauge package. The communication subsystem may be configured to receive control information from surface equipment and to convey the control information to the processing subsystem, so that operation of the partial discharge system can be modified, suspended, initiated, or otherwise controlled.

An alternative embodiment comprises a method for monitoring partial discharge in a downhole motor. The method begins with monitoring electrical signals at one or more power terminals of the downhole motor. The monitored signals are filtered and then processed to identify signal components that are associated with partial discharge in the motor. Partial discharge information is then generated from the identified signal components. The partial discharge information may consist of raw partial discharge data, computed values, or more complex analyses. The partial discharge information is then communicated to equipment that is remotely located from the downhole motor. The partial discharge information may be communicated via a dedicated line or a communication channel impressed on a power line, or it may be communicated to another ESP system component, such as a gauge package, which can communicate the information with its own data.

Another alternative embodiment comprises a partial discharge monitoring system apart from a downhole motor. This system includes an interface subsystem, a filter subsystem, a processing subsystem and a communication subsystem. The interface subsystem may have one or more high voltage probes configured to be coupled to one or more power terminals of the downhole motor. The filter subsystem may have a high voltage capacitor coupled to the interface subsystem and configured to filter signals from the high voltage probes. The processing subsystem may employ a high-temperature digital signal processor (DSP) which processes the filtered signals and generates partial discharge information. The communication subsystem transmits the partial discharge information to equipment remotely located from the partial discharge system (e.g., at the surface of the well. The partial discharge monitoring system may be contained in a motor head which enables the system to be modularly connected to the downhole motor. The partial discharge monitoring system may be configured to be coupled to a gauge package connected to the motor, and to make use of the gauge package's communication subsystem to communication information to the remotely located equipment.

Numerous other embodiments are also possible.

BRIEF DESCRIPTION OF THE DRAWINGS

Other objects and advantages of the invention may become apparent upon reading the following detailed description and upon reference to the accompanying drawings.

FIG. 3 is a diagram showing the portion of the ESP system containing the partial discharge monitoring components is shown in more detail.

FIG. 4 is a diagram showing an alternative embodiment in which the partial discharge monitoring system communicates with surface equipment via a gauge package.

Figure 1:
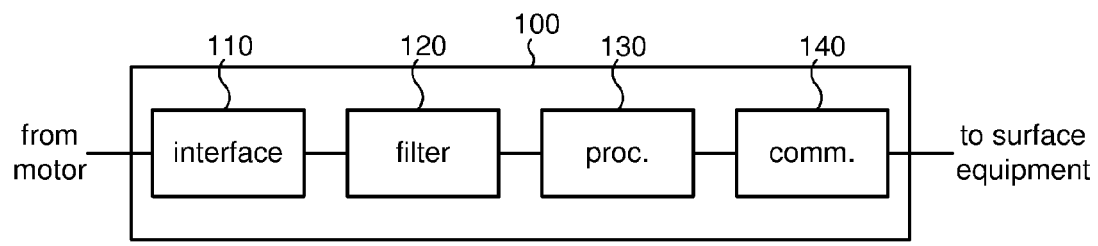
FIG. 1 is a functional block diagram illustrating the structure of a partial discharge monitoring system in accordance with one embodiment.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as defined by the appended claims.

DETAILED DESCRIPTION OF PREFERRED EMBODIMENTS

One or more embodiments of the invention are described below. It should be noted that these and any other embodiments described below are exemplary and are intended to be illustrative of the invention rather than limiting.

The increasing operating voltages and lifespans of downhole motors is increasing the importance of partial discharge monitoring in these motors. Partial discharge monitoring can be used to provide an indication of insulation quality within the motors, which can in turn indicate whether the motors are damaged, or whether they are likely to experience reduced performance or failure. Because of the remote location of a downhole motor (i.e., downhole in a well), it is difficult to implement partial discharge monitoring, so the monitoring of installed downhole motors traditionally has not been attempted. The present systems and methods utilize components that can operate reliably in the hostile environment that exists downhole, and does not require specialized partial discharge sensors, or specialized motor designs that incorporate such sensors.

The present systems and methods are capable of performing online testing of downhole motors (i.e., testing that is performed while the motors are operating). Additionally, off-line testing (i.e., testing that is performed while the motors are not operating) can be performed without having to remove the motors from the wells in which they are positioned. The present systems and methods monitor the motors' input power at the power terminals of the motors, rather than employing the types of sensors that are conventionally used for partial discharge testing in surface motors (e.g., acoustic sensors, radio frequency sensors, etc.). The characteristics of the input power examined to identify artifacts that are created by partial discharges within the motors. These artifacts can then be analyzed to identify metrics, such as peak partial discharge or total partial discharge, which can be used by system operators to determine the "health" of the motors.

Referring to FIG. 1, a functional block diagram illustrating the structure of a partial discharge monitoring system in accordance with one embodiment is shown. In this embodiment, partial discharge system 100 includes four components: an interface subsystem 110; a filter subsystem 120; a processing subsystem 130; and a communication subsystem 140. Interface subsystem 110 includes high voltage probes which are configured to be coupled to the power terminals of the downhole motor. A cable which provides power from a drive system at the surface of the well is connected to the power terminals within the head of the motor. The power terminals provide a convenient point for coupling of the interface subsystem to the motor's stator windings which is as close as possible to the area in which partial discharge will occur within the motor. This is important because the power artifacts which are caused by partial discharges are generally more degraded when they have to pass through longer lengths of wire to reach the probes of the monitoring system.

Interface subsystem 110 is coupled to filter subsystem 120. Filter subsystem 120 capacitively couples in the electrical signals from interface subsystem 110 to processing subsystem 130. Filter subsystem 120 may, for example, consist of a high voltage capacitor which blocks low-frequency components of the signal and passes high-frequency components such as voltage spikes caused by partial discharges to the processing subsystem. Processing subsystem 130 identifies components of the signal which correspond to partial discharges. Processing subsystem 130 may perform additional filtering to remove high-frequency noise, and may also perform various analyses on the partial-discharge-related components of the signal. For instance, processing subsystem 130 may identify peak values of partial discharge signals (Qm), or the total partial discharge (NQN). Processing subsystem 130 may also perform higher-level analyses, such as identifying trends in the partial discharge activity, determining the health of the motor, estimating a time to replacement of the motor, and the like. Alternatively, processing subsystem 130 may simply collect raw partial discharge data that is identified in the filtered signal.

The partial discharge information generated by processing subsystem 130 (e.g., raw partial discharge data, metrics or analyses) is forwarded to communication subsystem 140. Communication subsystem 140 is configured to transmit the partial discharge information to remotely located equipment (e.g., equipment located at the surface of the well), where it can be used by a well operator. The surface equipment may include control systems, data storage systems, user interfaces, or any other appropriate devices. Communication subsystem 140 may also be configured to receive information from the surface equipment. For example, the partial discharge monitoring system may be configured to allow control information to be transmitted from the surface to communication subsystem 140 in order to perform such functions as initiating testing, identifying analyses to be performed downhole, selecting parameters for use by the monitoring system, and so on.

It should be noted that downhole embodiments of the partial discharge monitoring system is intended to function in this harsh environment, which may have pressures from about 15-5000 psi and temperatures from about 0-150 C. The components of the system should therefore be capable of operating in the high pressures and high temperatures of a downhole environment.

Figure 2:
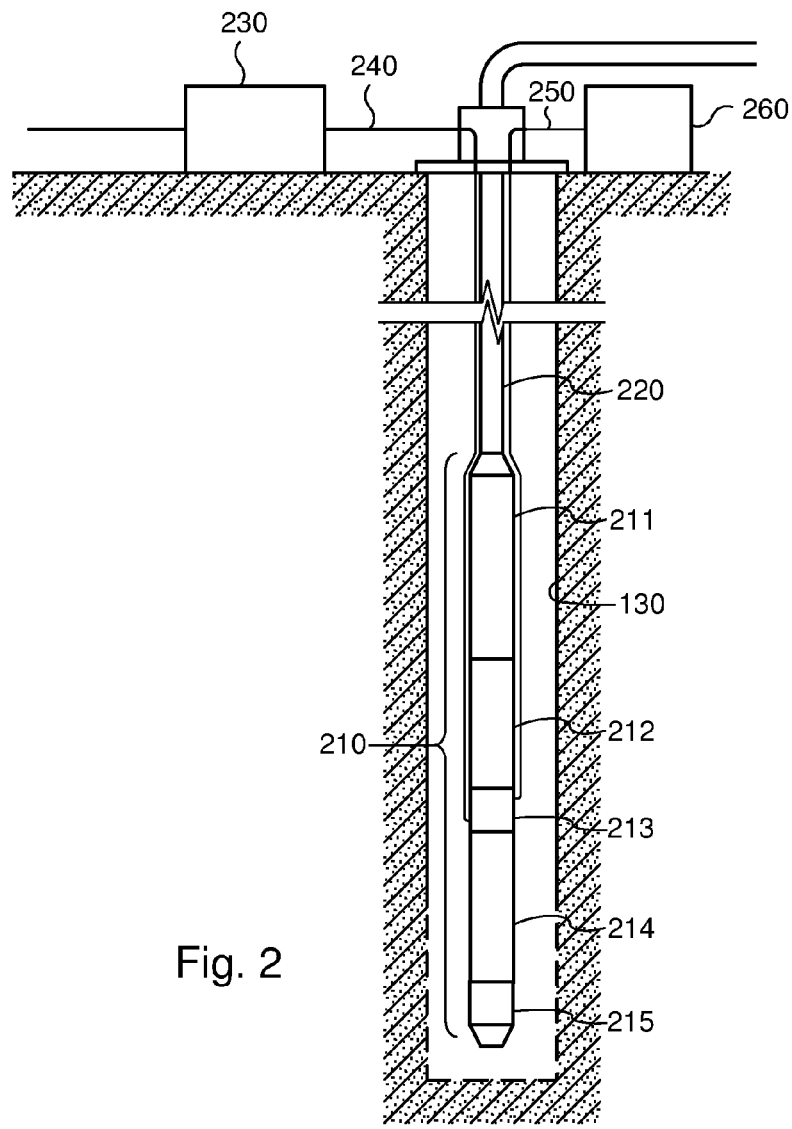
FIG. 2 is a diagram illustrating an ESP system in which partial discharge monitoring is implemented.

FIG. 2 is a diagram illustrating an ESP system in which partial discharge monitoring is implemented. In this embodiment, ESP system 210 is coupled to a tubing string or other conduit 220 and lowered into a well bore. ESP system 210 includes a pump 211, a seal 212, a partial discharge monitoring module 213, an electric motor 214, and a gauge package 215. A drive system 230 at the surface of the well is coupled to motor 213 by a power cable 240. A dedicated communications cable (which may be referred to as a "tech wire") 250 couples partial discharge monitoring module 212 to monitoring/control equipment 260 at the surface of the well.

Referring to FIG. 3, a diagram showing the portion of the ESP system containing the partial discharge monitoring components is shown in more detail. In this figure, it can be seen that the components of the partial discharge monitoring system are positioned in the head 300 of the motor, which serves as a housing for partial discharge monitoring module 212. Motor head 300 is connected to the top of motor 214 and couples the motor to seal 212. Because motor head 300 houses the components of the partial discharge monitoring system, the system can be implemented in a modular fashion (i.e., by replacing the conventional motor head with the one described here). This modular design can facilitate the upgrade of conventional motors to incorporate a partial discharge monitoring system.

As shown in FIG. 3, motor head 300 has a pothead 301, to which a conventional power cable 240 can be connected. Pothead 301 is itself of conventional design. Interface subsystem 310 consists of a set of high voltage probes that are connected to the power terminals of the motor. In one embodiment, the motor is a three-phase motor having three power terminals (one for each phase), so interface subsystem 310 includes a separate high voltage probe connected to each of the three power terminals. In this embodiment, each of the high voltage probes couples the power terminals to the data processing subsystem through corresponding high voltage capacitors. These high voltage capacitors comprise filter subsystem 320. The electrical signals comprising the input power at the power terminals are thereby high-pass filtered by filter subsystem 320 before being provided to data processing subsystem 330.

Data processing subsystem 330 samples the filtered signals and processes them to identify signal components that correspond to partial discharge events. Data processing subsystem 330 may be configured to perform a variety of processing functions, from simply identifying partial discharge signal components to more complex analyses of these signal components, such as determining peak partial discharge, determining total partial discharge, determining trends in the partial discharge signals over time, and so on. Digital signal processors (DSP's) that are capable of operating in high-pressure, high-temperature environments downhole have recently been developed, so these devices may be used to perform the functions of data processing subsystem 330.

The partial discharge information that is generated by data processing subsystem 330 is provided to communication subsystem 340. In this embodiment, communication subsystem 340 is configured to transmit the received information over a dedicated cable 250 to surface equipment which may enable a well operator to view, act on, or otherwise use the partial discharge information. Surface equipment may simply receive the information, display the information, further process the information, store the information, or take any other appropriate action with respect to the information. In some embodiments, communication subsystem 340 may be configured to receive as well as transmit data. In these embodiments, the well operator (or appropriate surface equipment) may communicate control information through cable 250 to the partial discharge monitoring system. Communication subsystem 340 may communicate instructions, requests, parameters, or any other received control information to data processing subsystem 330.

Referring to FIG. 4, a diagram showing an alternative embodiment is shown. In this embodiment, the components of the partial discharge monitoring system are again located in the motor head 400. The high voltage probes of interface subsystem 410 are coupled to the power terminals of the motor to pass electrical signals from the power terminals to filter subsystem 420. Filter subsystem 420 to passively couples the signals from the interface subsystem to data processing subsystem 430. Data processing subsystem 430 identifies partial-discharge-related signal components and processes this data to produce partial discharge information as described above. Data processing subsystem 430 forwards the partial discharge information to communication subsystem 440.

The embodiment of FIG. 4 differs from the embodiment of FIG. 3 in that communication subsystem 440 does not transmit the partial discharge information directly to the surface equipment. Instead, communication subsystem 440 forwards the partial discharge information via line 441 to a gauge package 450 which is connected to the bottom of the motor. Gauge package 450 incorporates its own communication subsystem 451 which is configured to transmit sensor information generated within the gauge package to equipment at the surface of the well. In this embodiment, the communication subsystem 451 transmits to the surface not only the sensor information of gauge package 450, but also the partial discharge information that is received from communication subsystem 440. As depicted in the figure, communication subsystem 451 utilizes a dedicated cable 452 to transmit the sensor information and partial discharge information to the surface equipment.

It should be noted that, while both the embodiment of FIG. 3 and the embodiment of FIG. 4 use a dedicated communication cable to transmit data to or from the surface equipment, it is possible in alternative embodiments to transmit the data using "comms-on" technology. "Comms-on" refers to communication techniques in which data transmissions are impressed upon the power cable that provides input power to the downhole motor. Because data is transmitted over the power cable, a dedicated data line (tech wire) is not necessary. There are a variety of techniques for transmitting data over power cables that range from simple low frequency current loop techniques to more complex methodologies, such as orthogonal frequency division multiplexing (OFDM). Any of these techniques may be used in various embodiments of the present invention.

Figure 5:
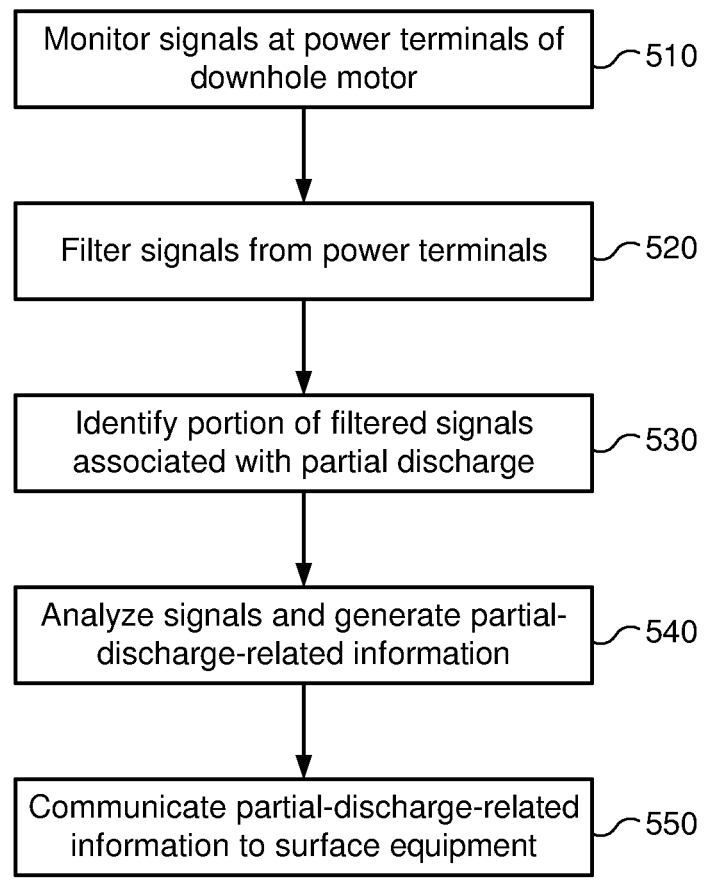
FIG. 5 is a flow diagram illustrating an exemplary method.

Another alternative embodiment of the invention comprises a method for monitoring partial discharge in a downhole motor. FIG. 5 is a flow diagram illustrating an exemplary method. The method begins with the monitoring of input power at the power terminals of the downhole motor (510). The monitoring may occur during normal operation of the downhole motor, or the input power provided to the motor may be modified specifically for the purpose of partial discharge testing. The input power signals at the power terminals of the motor are then filtered (520), such as by a high-voltage capacitor. The filtered signals are then processed to identify components of the signals that are associated with partial discharge in the motor (530). The identified signals may be analyzed (540) to determine various metrics, such as peak partial discharge or total partial discharge, to identify trends of the partial discharge behavior, or for other purposes. The partial discharge information (e.g., the identified partial discharge signals, or the results of the analyses) are then communicated to the appropriate equipment at the surface of the well (550). This data may be transmitted by dedicated line, comms-on communication channels, or any other suitable means.

As noted above, the embodiments described in detail above are exemplary, and alternative embodiments of the invention may vary from those above in various ways. For example, the filter subsystem may comprise a simple high voltage capacitor as described above, or it may be a more complex filter that is tuned to remove more of the unwanted noise or other components from the signal. Similarly, although the processing subsystem may employ a DSP as described above, any other microprocessor or data processing system that is capable of withstanding a downhole environment may be used in alternative embodiments. Consequently, it should be understood that the foregoing embodiments are illustrative and that the scope of the invention is not limited to these embodiments. Many additional variations, modifications, additions and improvements to the embodiments described above are possible. It is contemplated that these variations, modifications, additions and improvements fall within the scope of the invention as detailed within the following claims.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

What is claimed is:

1. An electric motor system configured to be installed in a location that is remotely located from and inaccessible by an operator, the electric motor system comprising:
   an electric motor; and
   a partial discharge system coupled to the motor, the partial discharge system including
      an interface subsystem, coupled to one or more power terminals of the motor,
      a filter subsystem coupled to the interface subsystem and configured to filter signals from the power terminals,
      a processing subsystem coupled to the filter subsystem and configured to process the filtered signals and thereby generate partial discharge information associated with the motor, and
      a communication subsystem coupled to the processing subsystem and configured to communicate the partial discharge information to surface equipment remotely located from the electric motor system;
   wherein at least a portion of the partial discharge system is contained in a housing of the motor.

2. The electric motor system of claim 1, wherein at least a portion of the partial discharge system is contained in a motor head which is connected to the motor.

3. The electric motor system of claim 1, further comprising a dedicated communication line coupled to the communication subsystem, wherein the communication subsystem is configured to communicate the partial discharge information to the surface equipment via the dedicated communication line.

4. The electric motor system of claim 1, wherein the communication subsystem is configured to communicate the partial discharge information to the surface equipment via a communication channel impressed upon a power cable that provides power to the motor.

5. The electric motor system of claim 1, further comprising a gauge package connected to the motor, wherein the communication subsystem of the partial discharge system is configured to communicate the partial discharge information to the surface equipment via a communication channel of the gauge package.

6. The electric motor system of claim 1, wherein the processing subsystem comprises a digital signal processor (DSP).

7. The electric motor system of claim 1, wherein the interface subsystem comprises one or more high voltage probes, wherein each of the high voltage probes is connected to a corresponding one of the power terminals.

8. The electric motor system of claim 1, wherein the filter subsystem comprises a high voltage capacitor.

9. The electric motor system of claim 1, further comprising the surface equipment which is remotely located from the electric motor system, wherein the surface equipment is coupled to the electric motor system and configured to receive the partial discharge information from the electric motor system.

10. The electric motor system of claim 1, wherein the communication subsystem is configured to receive control information from the surface equipment and to convey the control information to the processing subsystem, wherein the processing subsystem is configured to operate according to the received control information.

11. A method for monitoring partial discharge in a motor installed in a location that is remotely located from and inaccessible by an operator, the method comprising:
   monitoring electrical signals at one or more power terminals of the motor
   filtering the electrical signals from the power terminals;
   processing the filtered signals and thereby identifying components of the filtered signals that are associated with partial discharge in the motor, wherein at least a portion of the processing is performed by processing components contained within a housing of the motor;
   generating partial discharge information from the components of the filtered signals that are associated with partial discharge in the motor; and
   communicating the partial discharge information to equipment that is remotely located from the motor.

12. The method of claim 11, wherein generating the partial discharge information comprises collecting raw data associated with the components of the filtered signals that are associated with partial discharge in the motor.

13. The method of claim 11, wherein generating the partial discharge information comprises computing one or more partial discharge metrics.

14. The method of claim 11, wherein generating the partial discharge information comprises performing one or more analyses of the partial discharge in the motor.

15. The method of claim 11, wherein communicating the partial discharge information to equipment that is remotely located from the motor comprises impressing the partial discharge information on a power cable that is coupled between the motor and the remotely located equipment.

16. The method of claim 11, wherein communicating the partial discharge information to equipment that is remotely located from the motor comprises transmitting the partial discharge information on a dedicated communication line coupled between the motor and the remotely located equipment.

17. The method of claim 11, wherein communicating the partial discharge information to equipment that is remotely located from the motor comprises transmitting the partial discharge information to a gauge package that is coupled to the motor, wherein the gauge package transmits both the partial discharge information and information generated by the gauge package to the remotely located equipment.

18. The method of claim 11, wherein the method is performed during operation of the motor in a downhole environment.

19. The method of claim 13, wherein the method is performed during operation of the motor in a subsea environment.

20. A method for monitoring partial discharge in a motor installed in a location that is remotely located from and inaccessible by an operator, the method comprising:
   monitoring electrical signals at one or more power terminals of the motor filtering the electrical signals from the power terminals;
   processing the filtered signals and thereby identifying components of the filtered signals that are associated with partial discharge in the motor;
   generating partial discharge information from the components of the filtered signals that are associated with partial discharge in the motor; and
   communicating the partial discharge information to equipment that is remotely located from the motor by transmitting the partial discharge information to a gauge package that is coupled to the motor, wherein the gauge package transmits both the partial discharge information and information generated by the gauge package to the remotely located equipment.

* * * * *